(12) United States Patent
Pitzen (10) Patent No.: US 8,011,328 B2
(45) Date of Patent: Sep. 6, 2011

(54) LICK DETERRENT WITH BATTERY PACK

(75) Inventor: James F. Pitzen, Stillwater, MN (US)

(73) Assignee: Mark Anderson

( * ) Notice: Subject to any disclaimer, the term of this patent is extended or adjusted under 35 U.S.C. 154(b) by 15 days.

(21) Appl. No.: 12/274,783

(22) Filed: Nov. 20, 2008

(65) Prior Publication Data

US 2010/0122666 A1    May 20, 2010

(51) Int. Cl.
*A01K 13/00* (2006.01)
*A01K 15/00* (2006.01)
*A01K 29/00* (2006.01)
*A61D 9/00* (2006.01)

(52) U.S. Cl. ...................................... 119/859

(58) Field of Classification Search .......... 119/859, 119/719, 718, 712, 856, 174, 905, 908, 814, 119/821, 822, 882; 340/693.5, 573.1, 572.2, 340/572.3
See application file for complete search history.

(56) References Cited

U.S. PATENT DOCUMENTS

| | | | |
|---|---|---|---|
| 3,793,612 A * | 2/1974 | Driscoll | 439/402 |
| 3,944,803 A * | 3/1976 | Chao | 362/108 |
| 4,153,009 A * | 5/1979 | Boyle | 119/850 |
| 4,523,258 A * | 6/1985 | Morse et al. | 362/108 |
| 5,176,106 A * | 1/1993 | Casto et al. | 119/865 |
| 5,535,106 A * | 7/1996 | Tangen | 362/108 |
| 5,896,830 A * | 4/1999 | Stampe | 119/822 |
| 6,314,914 B1* | 11/2001 | Betzen | 119/712 |
| 6,453,850 B1* | 9/2002 | Stampe | 119/712 |
| 6,561,136 B2 | 5/2003 | Kuntz | |
| 6,646,855 B2* | 11/2003 | Buening et al. | 361/232 |
| 6,661,344 B2* | 12/2003 | Bowling | 340/573.3 |
| 6,817,138 B1 | 11/2004 | McGill | |
| 6,925,748 B2 | 8/2005 | McGill | |
| 7,020,995 B1 | 4/2006 | Snow | |
| 7,174,668 B2* | 2/2007 | Locklear | 43/17.1 |
| 7,219,627 B1 | 5/2007 | Egloff | |
| 7,726,262 B2* | 6/2010 | Stampe et al. | 119/850 |
| 2004/0000274 A1* | 1/2004 | James | 119/859 |

* cited by examiner

*Primary Examiner* — Rob Swiatek
*Assistant Examiner* — Ebony Evans
(74) *Attorney, Agent, or Firm* — Skinner and Associates (57) ABSTRACT

A lick deterrent device having a surface mounted battery pack that is in electrical contact with two sets of traces on the lick deterrent device. The surface mounted battery pack is readily attachable to the lick deterrent device, and in some embodiments, may be readily removable and replaceable. At least one of the battery terminals is in direct electrical contact with a trace on the substrate. The second terminal may have electrical contact with a different trace via a terminal extension element.

19 Claims, 8 Drawing Sheets

LICK DETERRENT WITH BATTERY PACK

FIELD OF THE INVENTION

The present disclosure relates to electrically activated devices for deterring animals from licking or disturbing wounds and/or dressings. More particularly, the present disclosure relates to battery packs for use with lick deterrent devices.

BACKGROUND OF THE INVENTION

Various designs of lick deterrent devices have been designed for discouraging animals from licking their wounds or wound dressings. For the most part, these devices have been cumbersome when attached to the animal, difficult to affix to the desired area, difficult to retain in the desired area, or have inadequate deterrent properties. Many of the deterrent devices include a battery or other power source electrically connected to the lick deterrent device, to provide a mild electrical shock to the animal when contact is made, for example, by the tongue of the animal. There is always room for improvement in the designs of lick deterrent devices and their deterrent modes.

BRIEF SUMMARY OF THE INVENTION

The present disclosure provides a lick deterrent device having a surface mounted battery pack that is in electrical contact with two sets of traces on the lick deterrent device. The surface mounted battery pack is readily attachable to the lick deterrent device, and in some embodiments, may be readily removable and replaceable. The battery pack consists of a case for holding the battery to the electrical traces.

In each of the embodiments of this disclosure, the battery pack is positioned on a generally planar substrate having electrically conductive traces thereon. A battery, having a first terminal (e.g., anode) and a second terminal (e.g., cathode) is retained by the battery pack in electrical contact with the traces. In accordance with this invention, at least one of the battery terminals is in direct electrical contact with a trace on the planar substrate. The second terminal may have electrical contact with a different trace via a terminal extension element.

In a first embodiment, this disclosure provides an electrically actuated lick deterrent device that has a flexible substrate with first side surface and an opposite second side surface, a first conductive trace and a second conductive trace both on the first side surface, with the second trace separate from the first trace. A battery pack is electrically connected to the substrate, the battery pack retaining a battery having an anode and a cathode, the battery pack retaining at least one of the anode or the cathode electrically against the first trace, and the battery pack including a terminal extension for connecting the other of the anode or the cathode to the second conductive trace.

In a second embodiment, this disclosure provides an electrically actuated lick deterrent device that has a flexible substrate with a first side surface and an opposite second side surface, a first conductive trace and a second conductive trace both on the first side, with the second trace separate from the first trace. A battery pack is present on the first side surface and is electrically connected to the substrate, the battery pack retaining a battery having an anode on a first side and a cathode on a second side opposite the first side against the substrate, the battery pack providing direct electrical contact between at least one of the anode or the cathode and the first conductive trace. The battery pack also provides electrical contact between the other of the anode and the cathode and the second conductive trace.

The battery pack may have a two part housing, with a first part of the housing present on the first side surface of the substrate and a second part of the housing present on the second side surface. The first part of the housing may be hingedly connected to the second part of the housing, such as by a living hinge. The first part of the housing may be configured to engage the second part of the housing. The first part of the housing and the second part of the housing may be on the same side or opposite sides of the flexible substrate, and, either or both parts may extend partially through the substrate.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION OF THE INVENTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense. Any definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The present disclosure relates to apparatuses for deterring animals from licking or otherwise disturbing protected areas, generally areas of their own body. In most embodiments, the deterrent device is attached to the animal's body over or proximate a wound or dressing. The lick deterrent device is a self-contained, relatively flat or planar device having a battery power source attached thereto to provide sufficient energy to the device to inhibit the animal from contacting the device.

Figure 1:
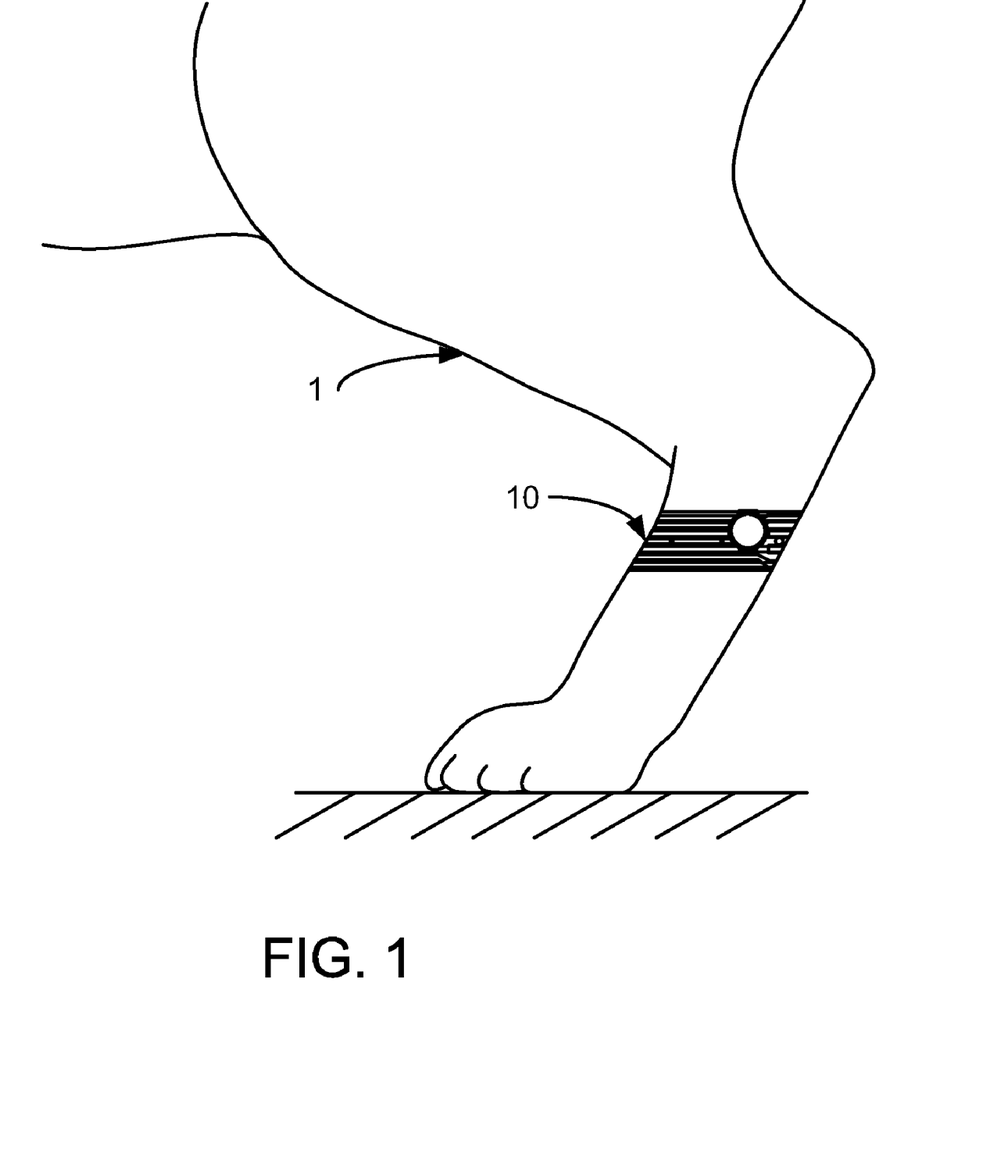
FIG. 1 is a partial side view of the body of a pet, having a lick deterrent device secured to the leg.

FIG. 1 illustrates a portion of a pet 1, specifically a dog, having a lick deterrent device 10 attached to a hind leg. Device 10 at least partially encircles the leg, protecting an area beneath or proximate device 10 from the pet's licking or other tampering. Although lick deterrent device 10 is illustrated on a hind leg of pet 1, it is understood that lick deterrent device 10 could be positioned on other areas of pet 1, such as a front leg, paw, tail, torso, or the like. It is not necessary that lick deterrent device 10 encircles an appendage or other part of pet 1, but rather, lick deterrent device 10 could be applied as a patch on an area, such as the torso.

Lick deterrent device 10 is an electrically actuated device that inhibits pet 1 from licking itself proximate device 10 (and also inhibits others from licking proximate device 10) by providing a mild electrical shock to the licking animal when contact is made with device 10. The discomfort is usually sufficient to inhibit future contact with device 10.

Device 10 may be adhesively attached to the skin, hair or fur of pet 1, for example, by a water soluble or solvent-based adhesive that is non-toxic to the pet. Alternately, device 10 may be encircled and connected to itself, for example, by a mechanical connection or adhesive. For embodiments that utilize an adhesive, a liner may be present over the adhesive. This liner is removed immediately prior to attachment of device 10 to pet 1, generally after attachment of the battery pack to the substrate. In some embodiments, that portion of the liner under the battery pack is not removed.

Figures 2, 2A:
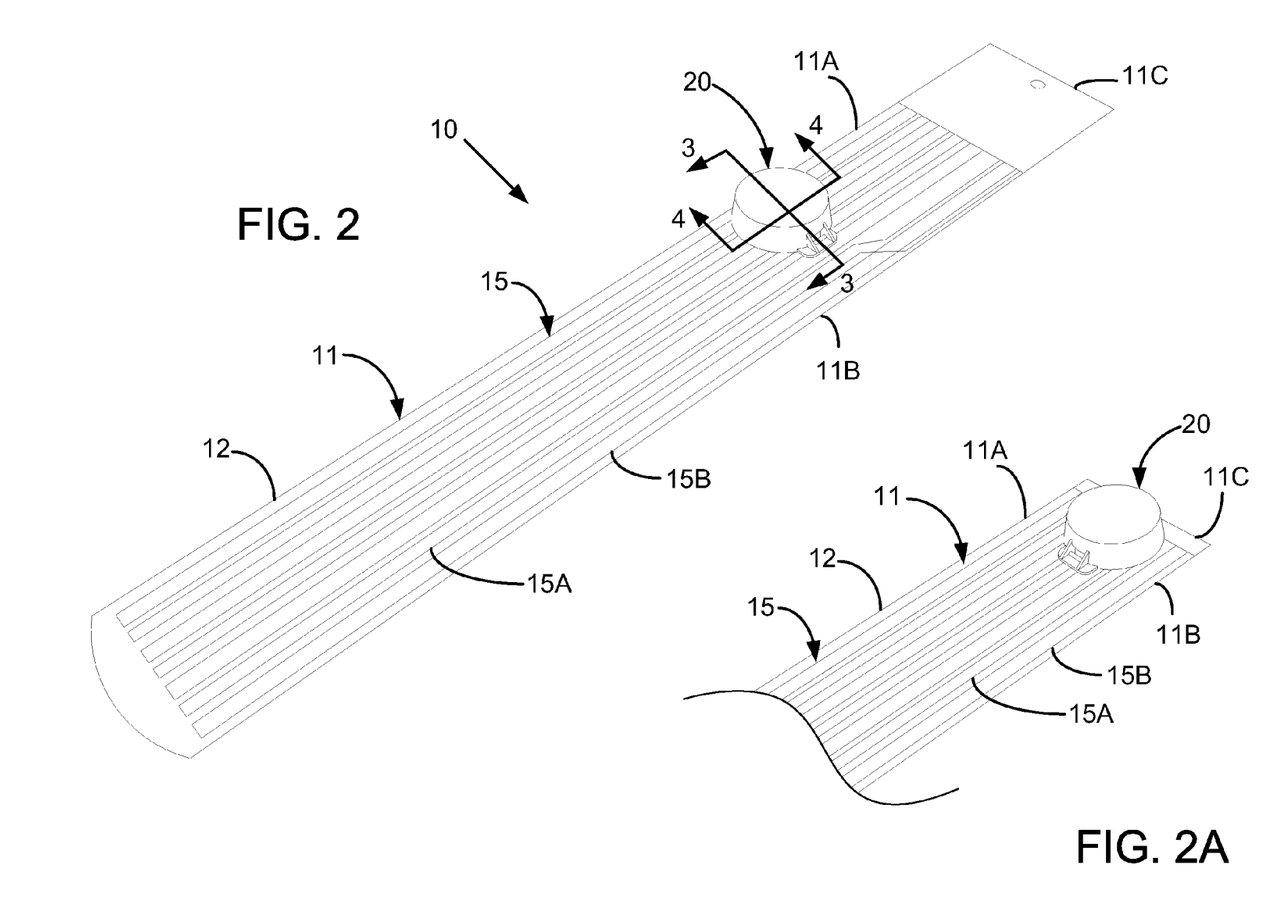
FIG. 2 is a perspective view of a lick deterrent device having a first embodiment of a battery pack according to this disclosure.
FIG. 2A is an alternate embodiment of the lick deterrent device of FIG. 2.

FIGS. 2 and 2A illustrate lick deterrent device 10 having a first embodiment of a battery pack 20 electrically connected thereto to provide energy to device 10 to produce the desired mild shock. Lick deterrent device 10 has an elongated flexible substrate 11 having a first side or surface 12 and an opposite second side or surface 14 (see FIGS. 3 and 4) with opposite side edges 11A and 11B and end edge 11C. An electrical circuitry 15 is present on first side or surface 12, with battery pack 20 electrically connected to circuitry 15 on first side or surface 12. Circuitry 15 has a plurality of conductive traces, first traces (e.g., anode traces) 15A and second traces (e.g., cathode traces) 15B, spaced from each other and extending generally the length of substrate 11. Second side or surface 14 has preferably no conducting material thereon, and is preferably electrically insulating.

Figure 5:
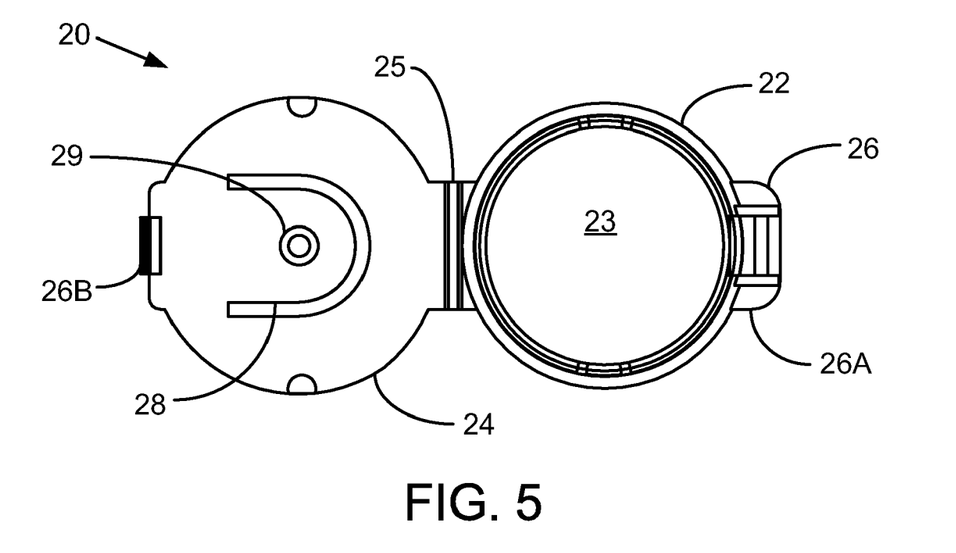
FIG. 5 is a top view wire frame of the battery case of FIG. 2.
Figure 6:
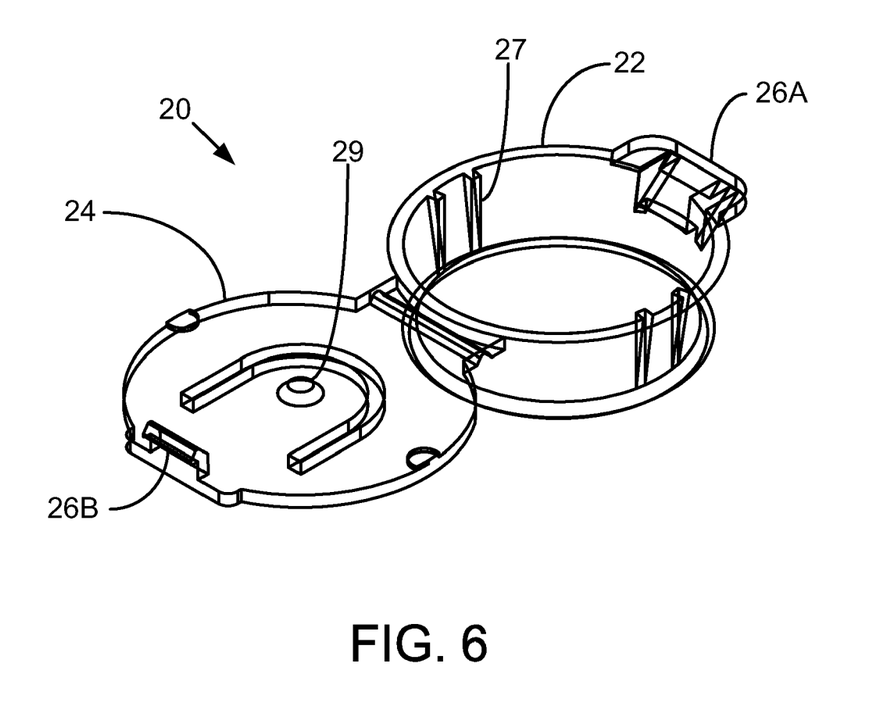
FIG. 6 is an isometric view wire frame of the battery case of FIG. 2.

Battery pack 20 and the later described embodiments of battery packs provide electrical connection to each of first traces 15A and second traces 15B, so that upon electrical connection between first traces 15A and second traces 15B (for example, by contact by the animal's tongue), the electrical circuit is completed and electricity flows through the circuit. Orthogonally oriented cross-sectional views of battery pack 20 mounted on substrate 11 are illustrated in FIGS. 3 and 4, and detailed figures of battery pack 20 are illustrated in FIGS. 5 and 6.

Battery pack 20 has a top housing 22 defining an interior chamber 23 for receiving a battery therein. Top housing 22 is configured to sit on first side or surface 12 of substrate 11, proximate circuitry 15. Battery pack 20 also includes a lower housing portion 24, configured to be on the opposite side of substrate 11 (i.e., on second side or surface 14). Together, top housing 22 and lower housing portion 24 provide a case for receiving the battery therein. Top housing 22 and lower housing portion 24 are hingedly connected by a living hinge 25. Top housing 22 and lower housing portion 24 can be releasably engaged via latch 26 to gain access to interior chamber 23. Top housing 22 has a first portion 26A of latch 26 and lower housing portion 24 has second portion 26B of latch 26; portions 26A, 26B engage to hold top housing 22 and lower housing 24 together. In FIG. 3 battery pack 20 is readily seen attached to substrate 11, with top housing 22 on first side or surface 12 and lower housing portion 24 on second side or surface 14, with hinge 25 at side edge 11A. Battery pack 20 may be positioned proximate any of side edge 11A, side edge 11B or end edge 11C. FIG. 2A illustrates battery pack 20 attached to substrate 11 at end edge 11C.

Lower housing portion 24 includes a moveable flap 28 integral with portion 24. Flap 28 is readily moveable into and away from interior chamber 23 when lower housing portion 24 is engaged with top housing 22 to form an enclosure. Flap 28 has an inherent spring constant based on the material of lower housing portion 24 and the physical configuration of flap 28. On flap 28 is a protrusion 29 that extends toward second side or surface 14 of substrate 11 when battery pack 20 is engaged with substrate 11.

Figure 3:
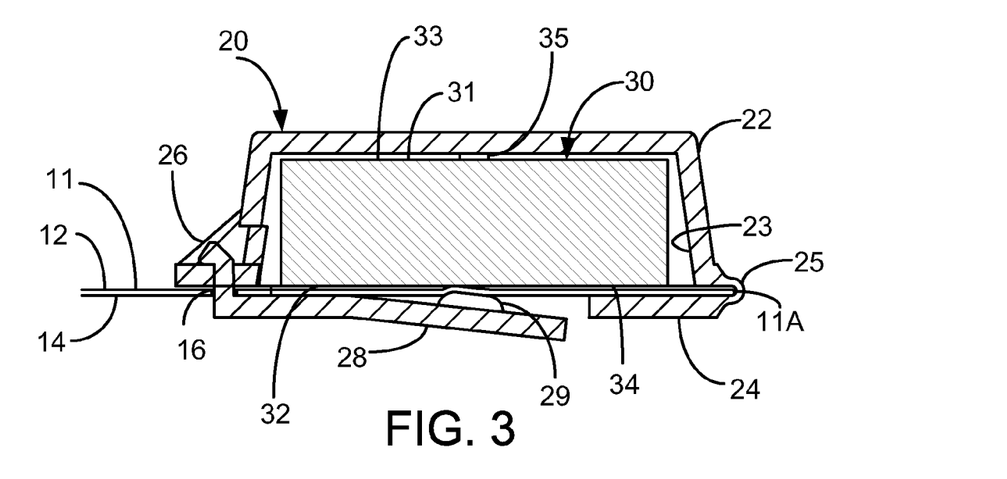
FIG. 3. is a cross-sectional view of the lick deterrent device and battery pack taken along line 3-3 of FIG. 2.
Figure 4:
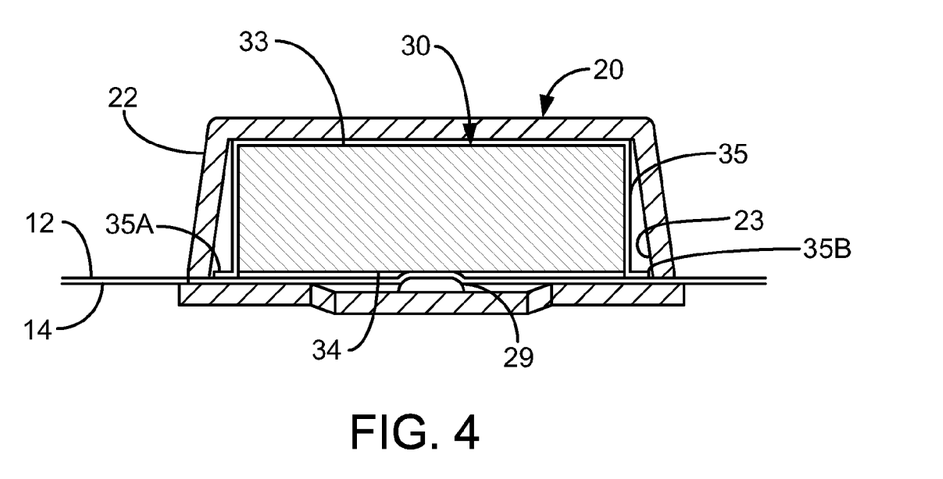
FIG. 4. is a cross-sectional view of the lick deterrent device and battery pack taken along line 4-4 of FIG. 2.

Illustrated in FIGS. 3 and 4 within interior 23 of battery pack 20 is a battery 30, such as a button battery. It should be understood that a "battery" may be one or more battery cells electrically connected in series. Battery 30 has a first side 31 and an opposite second side 32 opposite first side 31. Present on first side 31 is a first terminal 33 (e.g., the anode) and present on second side 32 is a second terminal 34 (e.g., the cathode). To obtain electrical contact with both first terminal 33 and second terminal 34 on the same side of battery 30, a terminal extension 35 is electrically connected to first terminal 33 of battery 30 and extends toward second terminal 34 without contacting second terminal 34. See FIG. 4, where terminal extension 35 is composed of two legs of electrically conducting material. Terminal extension 35 may be permanently attached to battery 30 or to top housing 22 or may be removably positioned in relation to battery 30. Upon placing battery 30 into housing 22, extension 35 contacts first terminal 33. Terminal extension 35 has ends 35A, 35B that contact first side or surface 12 of substrate 11 when top housing 22 is fitted against substrate 11. In FIGS. 5 and 6, top housing 22 includes guides 27 for maintaining the position of terminal extension 35.

Returning to FIGS. 2 and 2A, substrate 11 of lick deterrent device 10 is a flexible, non-conductive substrate, such as paper or plastic. Substrate 11 is preferably a rectangular strip with surfaces 12, 14 generally being flat. Side edges 11A, 11B are preferably parallel and linear, although other designs could be used. End edge 11C is typically orthogonal to side edges 11A, 11B.

Circuitry 15 is present on first side or surface 12 of substrate 11. Traces 15A, 15B of circuitry 15 are electrically conducting stripes present at the surface of substrate 11. In some embodiments, traces 15A, 15B may be present on the surface of substrate 11 (e.g., coated or plated onto substrate 11) or may be partially embedded into substrate 11. In other embodiments, traces 15A, 15B may be provided on a separate carrier layer that is applied onto substrate 11. The conductive material may be provided, for example, as particulates that are coated or printed from a slurry or dispersion. Alternately, the conductive material may be deposited (e.g., by chemical vapor deposition) or plated. Examples of suitable electrically conductive material include carbon (e.g., carbon black, graphite), silver, gold, titanium, platinum, palladium, and various combinations thereof, such as silver-impregnated carbon, silver and chloride mixtures (e.g., Ag/AgCl). Traces 15A, 15B may be designed to control and/or limit the current flow therethrough, for example, so that pet 1 does not receive too large of a shock or to inhibit the device from shorting. In preferred embodiments, traces 15A, 15B have a resistivity of about 500-50,000 ohms.

In use, battery pack 20 is electrically connected to substrate 11 and attached to an animal, as illustrated in FIG. 1. In order to properly function and provide a mild shock to prevent future contact with lick deterrent device 10 by the animal, both terminals 33, 34 of battery 30 need to contact circuitry 15, for example, terminal 33 needs to contact traces 15A and terminal 34 needs to contact traces 15B.

To electrically attach battery pack 20 to substrate 11 to form lick deterrent device 10, as shown in FIGS. 1, 2 and 2A, battery pack 20 is positioned with top housing 22 on first side or surface 12 and with lower housing portion 24 on second side or surface 14. In most embodiments, hinge 25, the connection between top housing 22 and lower housing portion 24, is positioned adjacent an edge of substrate 11, e.g., end edge 1 IC (see FIG. 2A) or side edge 11A (see FIG. 3). In the embodiment of FIG. 3, latch portion 26B is passed through aperture 16 in substrate 11, and latch portion 26B is engaged with latch portion 26A to close lower housing portion 24 with top housing 22 and form interior chamber 23 for retaining battery 30 therein. Battery 30 may be a permanent fixture of battery pack 20 or may be placed within interior chamber 23 before or after passing latch portion 26B through substrate 11, but definitely before engaging latch portion 26B with latch portion 26A.

With latch 26 closed, protrusion 29 on flap 28 provides sufficient pressure against second side or surface 14 of substrate 11 to provide direct electrical contact between one of traces 15A or 15B on surface 12 with second terminal 34 of battery 30. Simultaneously, at least one of terminal extension ends 35A, 35B, which are electrically connected to first terminal 33 of battery 30, electrically contacts the other of traces 15A, 15B. Battery pack 20 may be adjusted after placement on substrate 11 to ensure good contact with traces 15A and 15B.

Figure 7:
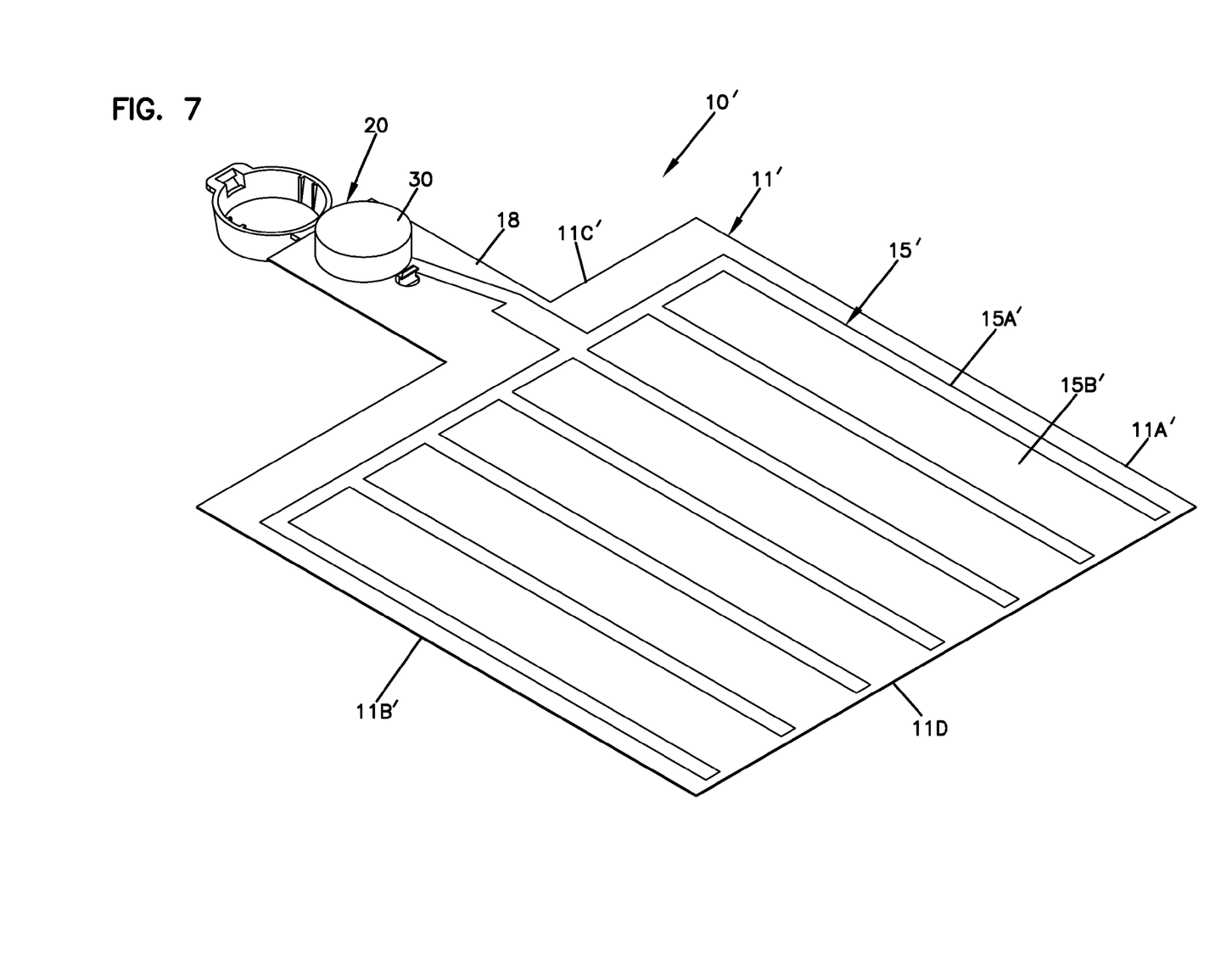
FIG. 7 is a perspective view of an alternate embodiment of a lick deterrent device with the battery pack of FIG. 2.

FIG. 7 illustrates an alternate configuration for a lick deterrent device, in particular, an alternate configuration for the substrate. In FIG. 7, lick deterrent device 10' has an elongated flexible substrate 11' with opposite side edges 11A' and 11B' and end edges 11C', 11D. Electrical circuitry 15' is present on substrate 11', with battery pack 20 electrically connected to circuitry 15'. Circuitry 15' has a plurality of conductive traces, first traces (e.g., anode traces) 15A' and second traces (e.g., cathode traces) 15B', spaced from each other and extending generally the length and width of substrate 11'. Battery pack 20 and the later described embodiments of battery packs provide electrical connection to each of first traces 15A' and second traces 15B', so that upon electrical connection between first traces 15A' and second traces 15B' (for example, by contact by the animal's tongue), the electrical circuit is completed and electricity flows through the circuit. In this embodiment, battery pack 20 is positioned on a tab 18 of substrate 11'. Tab 18 is configured to be folded under after application of lick deterrent device 10' over the desired surface; folding tab 18 hides battery pack 20 and inhibits the pet from damaging or playing with battery pack 20.

This particular configuration of substrate 11' and circuitry 15' allows the user to physically configure substrate 11' to a desired length and width. For example, the width of substrate 11' could be reduced by trimming substrate 11' along either or both side edges 11A, 11B. Alternately or additionally, the length of substrate 11' could be reduced by trimming substrate along end edge 11D.

For battery pack 20 and the additional embodiments of battery packs described below, substrate 11 remains essentially planar proximate the location of battery pack 20 after electrical connection of battery pack to traces 15A, 15B. That is, substrate 11 is not significantly bent, folded or otherwise manipulated in order to activate battery 30; substrate 11' may be bent, for example, to hide battery pack 20. In each of the following embodiments, battery pack 20 contacts both traces 15A, 15B on the same side of battery pack 20 and in the immediate proximate area of substrate 11.

Figure 10:
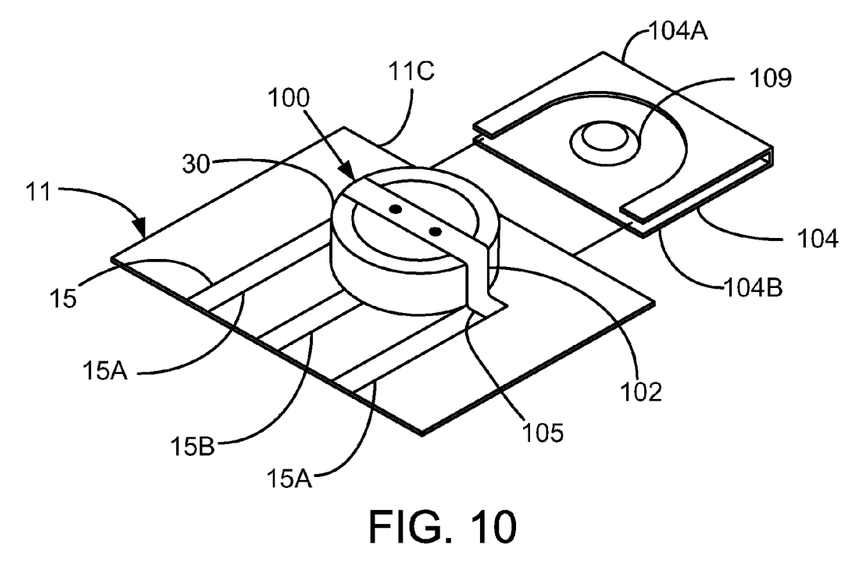
FIG. 10 is a perspective view of a portion of a lick deterrent device and a third embodiment of a battery pack.
Figure 11:
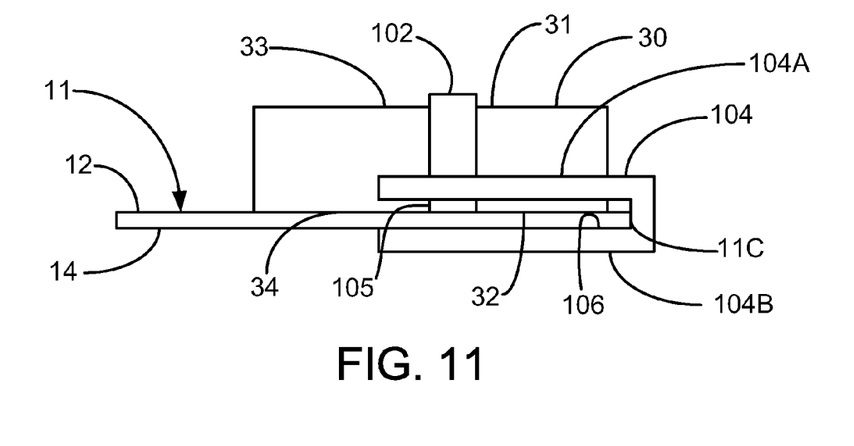
FIG. 11 is a side view of the lick deterrent device and battery pack of FIG. 10.
Figure 12:
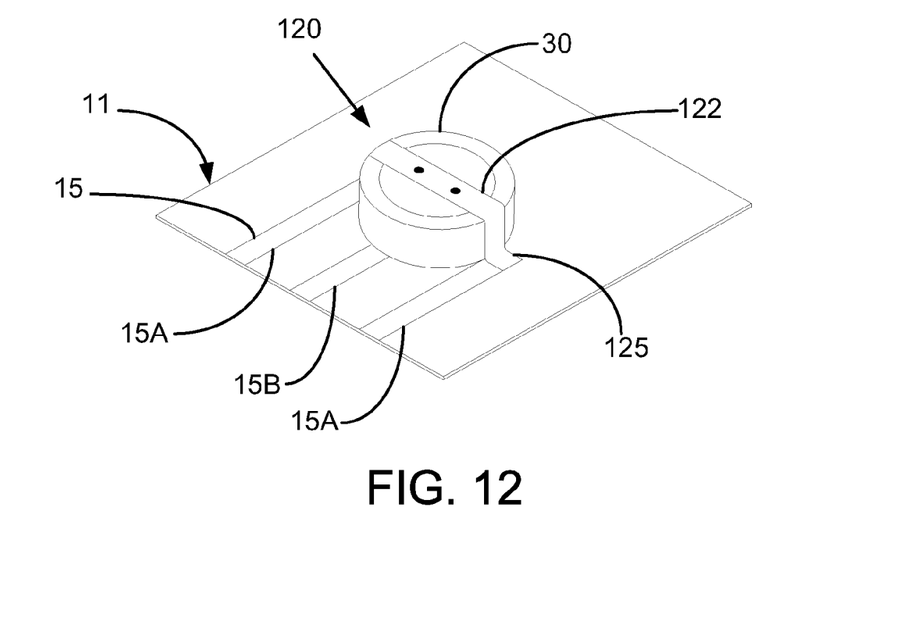
FIG. 12 is a perspective view of a portion of a lick deterrent device and a fourth embodiment of a battery pack.
Figure 13:
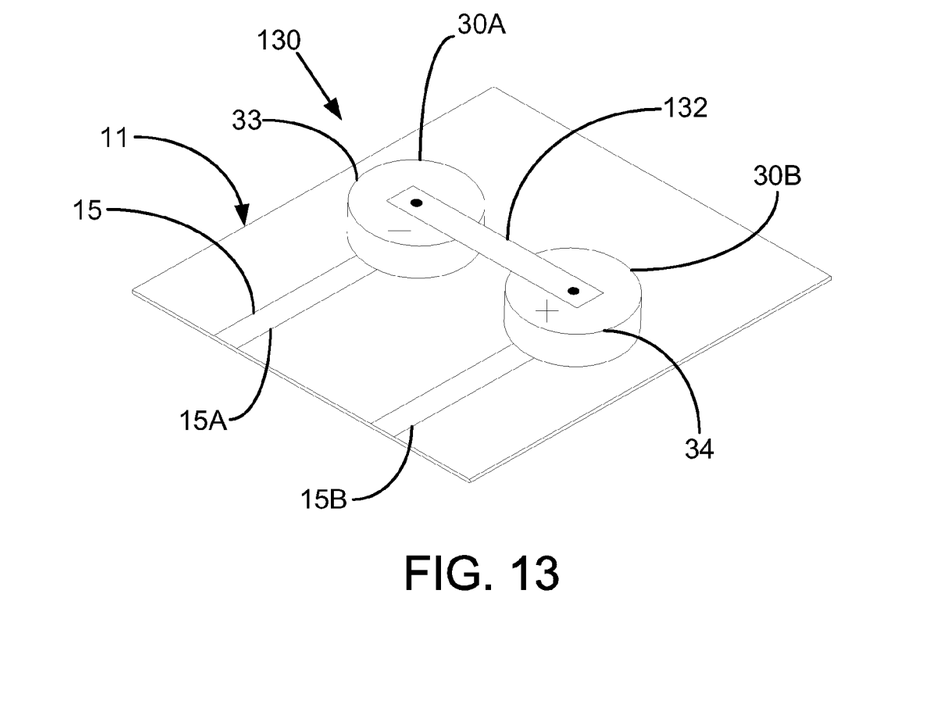
FIG. 13 is a perspective view of a portion of a lick deterrent device and a fifth embodiment of a battery pack.

Additional embodiments of battery packs for use with lick deterrent device 10 are illustrated in FIGS. 8 through 13. Each of these embodiments provides a battery on first side or surface 12 of substrate 11 that is electrically connected to both first traces 15A and second traces 15B. In the embodiments of FIGS. 8 through 11, the battery packs have a first portion on the first side of substrate 11 and a second portion on the second side of substrate 11 and are held onto substrate 11 by mechanical engagement of the two portions, as is the embodiment of FIGS. 2 through 7. The embodiments of FIGS. 12 and 13 are single portion battery packs, held onto substrate 11 by mechanisms such as adhesive, solder, welding, or the like.

Figure 8:
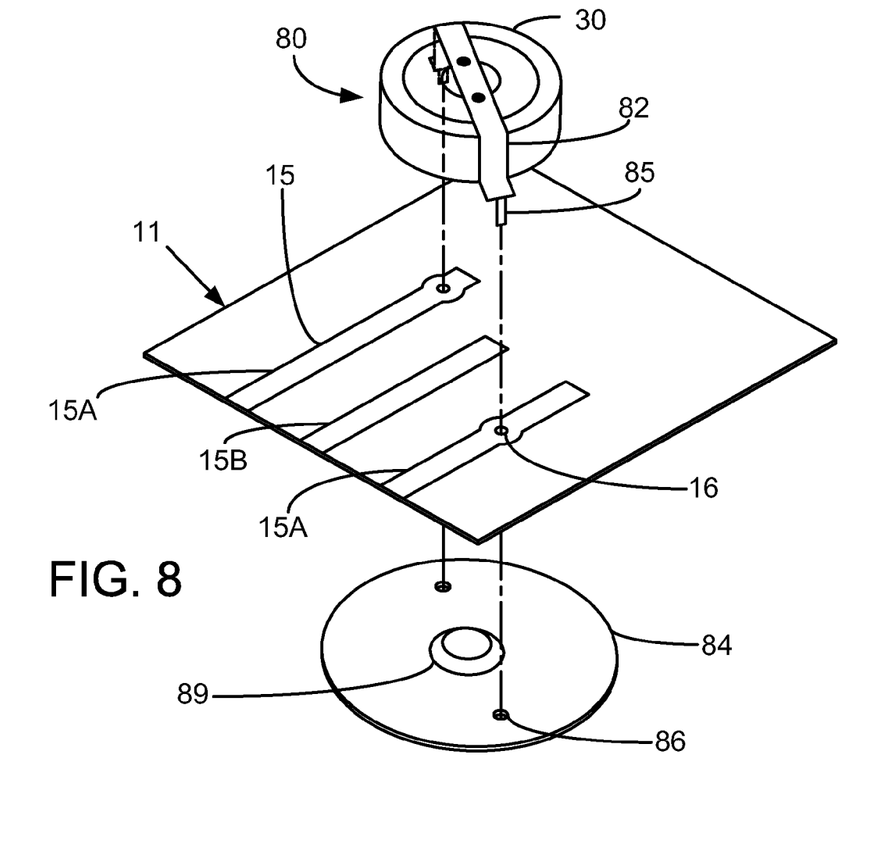
FIG. 8 is a perspective view of a portion of a lick deterrent device and a second embodiment of a battery pack.
Figure 9:
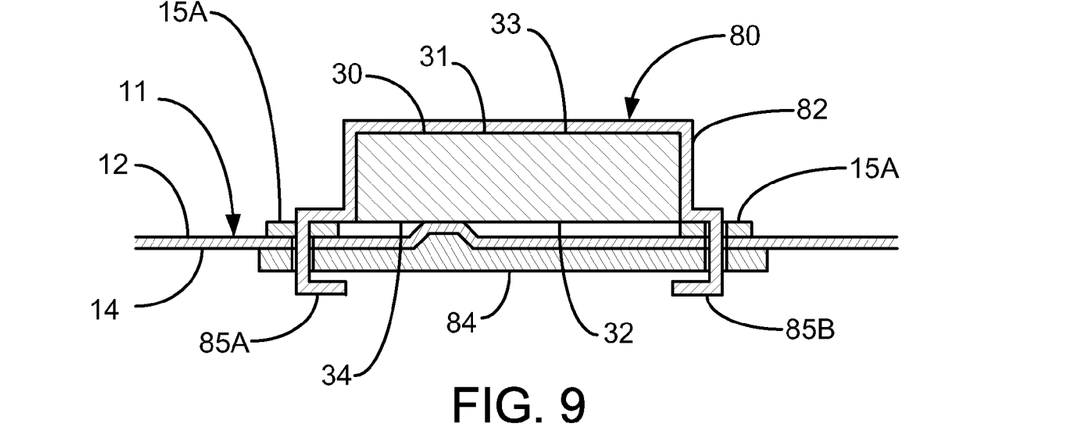
FIG. 9 is a cross-sectional side view of the lick deterrent device and battery pack of FIG. 8.

FIGS. 8 and 9 provide an embodiment of a battery pack having a first portion on the first side of substrate 11 and a second portion on the second side of substrate 11. Battery pack 80 has a top portion 82 generally present on first side or surface 12 of substrate 11 and a lower portion 84 present on second side or surface 14 of substrate 11. Lower portion 84 includes a protrusion 89 that extends toward second side or surface 14 of substrate 11 when battery pack 80 is engaged with substrate 11. In this embodiment, top portion 82 does not encircle battery 30 forming an interior chamber, but rather, top portion 82 extends over top side 31 of battery 30 toward bottom side 32.

In this embodiment, top portion 82 is similar to terminal extension 35 of battery pack 20, described above, but is not present within a chamber. Top portion 82 extends over top side 31 of battery 30 and includes end legs 85, in this embodiment end legs 85A, 85B that extend through substrate 11 and contact second side or surface 14 of substrate 11. End legs 85 also extend through aperture 86 in lower portion 74. End legs 85 may be manually bent after passing through lower portion 84 to lock lower portion 84 to second side or surface 14 of substrate 11. Top portion 82 and legs 85 are electrically conductive.

To electrically attach battery pack 80 to substrate 11 to form lick deterrent device 10, as shown in FIG. 1, top portion 82 is attached to battery 30 and positioned on first side or surface 12. End legs 85 are passed through apertures 16 in substrate and through apertures 86 in lower portion 84. In this embodiment, apertures 16 pass through one of traces 15A, 15B (in the illustrated embodiment, traces 15A). Legs 85A, 85B are configured (e.g., bent) to hold top portion 82 tight to both first terminal 33 and to traces 15A and to hold lower portion 84 tightly against second side or surface 14 of substrate 11. With this configuration, second terminal 34 has direct electrical contact to trace 15B and electrical connection between first terminal 33 and trace 15A is via end legs 85. Battery 30 may be permanently attached to top portion 82 or may be placed proximate top portion 82 (and optionally adhered or otherwise affixed to top portion 82) before or after passing legs 85 through substrate 11, but definitely before bending legs 85A, 85B. With lower portion 84 held tight to surface 14, protrusion 89 provides sufficient pressure against second side or surface 14 of substrate 11 to provide electrical contact between traces 15B on surface 12 with second terminal 34 of battery 30.

FIGS. 10 and 11 provide an embodiment of a battery pack having a first portion on the first side of substrate 11 and a second portion on both sides of substrate 11. Battery pack 100 has a top portion 102 present on first side or surface 12 of substrate 11 and a second portion 104 present on both first side or surface 12 and second side or surface 14 of substrate 11.

In this embodiment, top portion 102 is similar to top portion 82 of battery pack 80 of FIGS. 8 and 9, in that it does not encircle battery 30 forming an interior chamber, but rather, top portion 102 extends over top side 31 of battery 30 toward bottom side 32, where top portion 102 terminates in contact with traces 15A at legs 105. Top portion 102 and legs 105 are electrically conductive. Second portion 104 holds top portion 102 in tight connection with traces 15A.

Second portion 104 has a member 104A and a member 104B which define a channel 106 therebetween. Second portion 104 is configured to slide and seat onto substrate 11 with member 104A adjacent first side or surface 12 and member 104B adjacent second side or surface 14. Second portion 104 may include an optional protrusion 109 on member 104B that extends toward second side or surface 14 of substrate 11 when battery pack 100 is engaged with substrate 11, to increase the pressure against second surface 14 and pushing trace 15B against battery terminal 34. In FIGS. 10 and 11, battery pack 100 is positioned so that second portion 104 seats against substrate end 11C.

To electrically attach battery pack 100 to substrate 11 to form lick deterrent device 10, as shown in FIG. 1, top portion 102 is attached to battery 30 and positioned on first side or surface 12 so that legs 105 of top portion 102 engage traces 15A. Second portion 104 is slid over substrate end 11C so that member 104A is adjacent first side or surface 12 and member 104B is adjacent second side or surface 14; substrate 11 and legs 105 are received into channel 106. Second portion 104 holds legs 105 tight against traces 15A and also holds traces 15B tight against battery second terminal 34 by applying pressure to second side or surface 14 of substrate 11.

FIG. 12 provides a first embodiment of a battery pack having only one portion, which is on the first side of substrate 11. Battery pack 120 has a holding portion 122 present on first side or surface 12 of substrate 11. Holding portion 122 is similar to top portion 82 of battery pack 80 of FIGS. 8 and 9 and to first portion 102 of battery pack 100 of FIGS. 10 and 11, in that it does not encircle battery 30 forming an interior chamber, but rather, holding portion 122 extends over the top side of battery 30 toward the bottom side, where holding portion 122 terminates in contact with traces 15A at legs 125. Legs 125 are connected to traces 15A, for example, by solder, conductive adhesive, welding, or the like. Holding portion 122 and legs 125 are electrically conductive, to provide a continuous connection from battery 30 to traces 15A. The bottom of battery 30 seats on and contacts traces 15B; battery 30 may be connected to trace 15B, for example, by solder, conductive adhesive, welding or the like, and may be readily removable and replaceable or may be permanently attached to substrate 11.

FIG. 13 provides a second embodiment of a battery pack having only one portion, which is on the first side of substrate 11. Unlike the previous embodiments, battery pack 130 utilizes two batteries, battery 30A and battery 30B. Batteries 30A, 30B are attached to substrate 11 in opposite orientations, in the illustrated embodiment, with the first terminal 33 exposed for battery 30A and with second terminal exposed for battery 30B. With these opposite orientations, each battery 30A contacts one set of traces; in the illustrated embodiment, first battery 30A contacts traces 15A and second battery 30B contacts second traces 15B. Batteries 30A, 30B are connected to traces 15A, 15B, respectively, for example, by solder, conductive adhesive, welding, or the like, and may be readily removable and replaceable or may be permanently attached to substrate 11. Batteries 30A, 30B are connected together by a holding portion 132.

Any or all of the battery pack embodiments of this disclosure may be permanently attached or affixed to substrate 11 or may be removable and replaceable.

Each of the embodiments of the battery pack (e.g., battery pack 20, 80, 100, 120) have included battery 30 electrically connected to circuitry 15. Battery pack 130 utilizes two batteries 30A, 30B, which are preferably identical. A suitable battery 30, 30A, 30B is a button type battery having an output of at least about 3 volts, and in some embodiments, at least about 9 volts, depending on the size of the lick deterrent device and the animal for which it is intended. Batteries with 9-15 volts will typically produce a sufficiently unpleasant sensation that deters the animal from future contact with deterrent device 10. Battery 30 may be permanently attached within the battery pack itself (e.g., within top housing 22, to top portion 82 or 102, or to holding portion 122 or 132).

The battery packs of this disclosure (e.g., battery pack 20, 80, 100, 120) are each relatively small and non-obtrusive to the pet on which they are installed. A typically 3 volt battery is no more than about 3 cm in diameter with a thickness of no more than about 1 cm. In many embodiments, the battery is no larger than about 2.5 cm in diameter. Some suitable batteries have a thickness no greater than about 0.5 cm. In most embodiments, the battery pack is not much larger than battery 30, increasing either the diameter or height of battery 30 no more than about 1 cm and in some embodiments, no more than about 5 mm. In some embodiments, the housing of the battery pack (e.g., top housing 22 of battery pack 20) is no more than 2.5 mm thick, thus the housing having a diameter only about 5 mm greater than battery 30 and only about 2.5 mm higher than battery 30.

Thus, embodiments of the LICK DETERRENT WITH BATTERY PACK are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. An electrically actuated lick deterrent device comprising:
    a flexible substrate having first side surface and an opposite second side surface, a first conductive trace and a second conductive trace both on the first side surface, the second trace separate from the first trace;
    a battery pack electrically connected to the substrate, the battery pack retaining a button battery having a disc shape with top and bottom flat, circular sides and a circumferential edge, the battery having an anode on one side and a cathode on the other side, the battery pack retaining at least one of the anode or the cathode electrically against the first trace, and the battery pack including a terminal extension for connecting the other of the anode or the cathode to the second conductive trace, the terminal extension including a top portion extending over the top side of the battery, a pair of edge portions extending from the top portion over the circumferential edge of the battery and an end portion extending from the end of each edge portion and in contact with the conductive traces of the substrate, whereby an electrical circuit is completed and electricity flows through the circuit upon electrical connection between one first conductive trace and one second conductive trace caused by an animal's tongue.

2. The lick deterrent device of claim 1 wherein the battery pack comprises a two part housing, with a first part of the housing present on the first side surface of the substrate and a second part of the housing present on the second side surface.

3. The lick deterrent device of claim 2 wherein the first part of the housing is hingedly connected ,to the second part of the housing.

4. The lick deterrent device of claim 3 wherein the first part of the housing is hingedly connected to the second part of the housing by a living hinge.

5. The lick deterrent device of claim 2 wherein the first part of the housing is configured to engage with the second part of the housing.

6. The lick deterrent device of claim 2 wherein the second part of the housing is present on the first side surface and the second side surface.

7. The lick deterrent device of claim 2 wherein the terminal extension is present within the first part of the housing, present between the battery and the housing.

8. The lick deterrent device of claim 1 wherein the battery pack is permanently connected to the substrate.

9. The lick deterrent device of claim 1 wherein the battery is permanently retained in the battery pack.

10. The lick deterrent device of claim 1 wherein the flexible substrate is folded.

11. An electrically actuated lick deterrent device comprising:
a flexible substrate having first side surface and an opposite second side surface, a first conductive trace and a second conductive trace both on the first side, the second trace separate from the first trace;
a battery pack present on the first side surface of the substrate and electrically connected to the substrate, the battery pack retaining a button battery having first and second flat sides and an outer edge, the battery having an anode on the first side of the battery and a cathode on the second side of the battery opposite the first side against the substrate, the battery pack providing direct electrical contact between at least one of the anode or the cathode and the first conductive trace, the battery pack further having a terminal extension for connecting the other of the anode or cathode, the terminal extension including a top portion extending over the anode or cathode which is not in contact with the first conductive trace, edge portions extending from the top portion over the battery edge and end portions extending from the edge portions and in contact with the conductive traces, whereby an electrical circuit is completed and electricity flows through the circuit upon electrical connection between one first conductive trace and one second conductive trace caused by an animal's tongue.

12. The lick deterrent device of claim 11 wherein the battery pack comprises a two part housing, with a first part of the housing present on the first side surface of the substrate and a second part of the housing present on the second side surface.

13. The lick deterrent device of claim 12 wherein the first part of the housing is hingedly connected to the second part of the housing.

14. The lick deterrent device of claim 13 wherein the first part of the housing is hingedly connected to the second part of the housing by a living hinge.

15. The lick deterrent device of claim 12 wherein the first part of the housing is configured to engage with the second part of the housing.

16. The lick deterrent device of claim 12 wherein the second part of the housing is present on the first side surface and the second side surface.

17. The lick deterrent device of claim 11 wherein the other of the anode or the cathode is in direct electrical contact with the second conductive trace.

18. The lick deterrent device of claim 11 wherein the battery pack is permanently connected to the substrate.

19. The lick deterrent device of claim 11 wherein the battery is permanently retained in the battery pack.

* * * * *